United States Patent Office 3,310,119
Patented Mar. 21, 1967

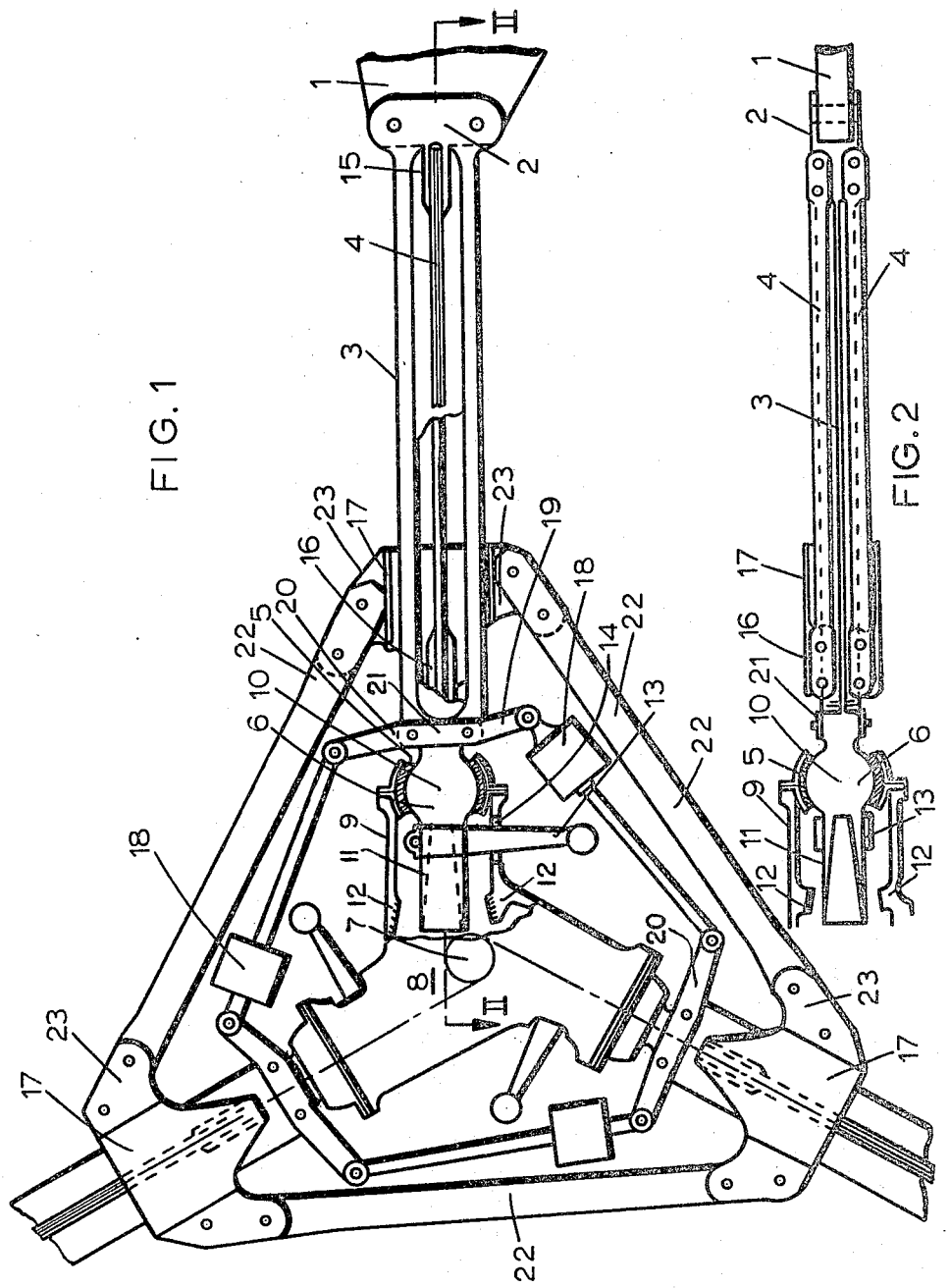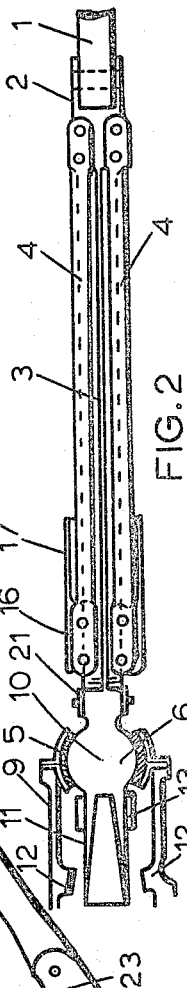

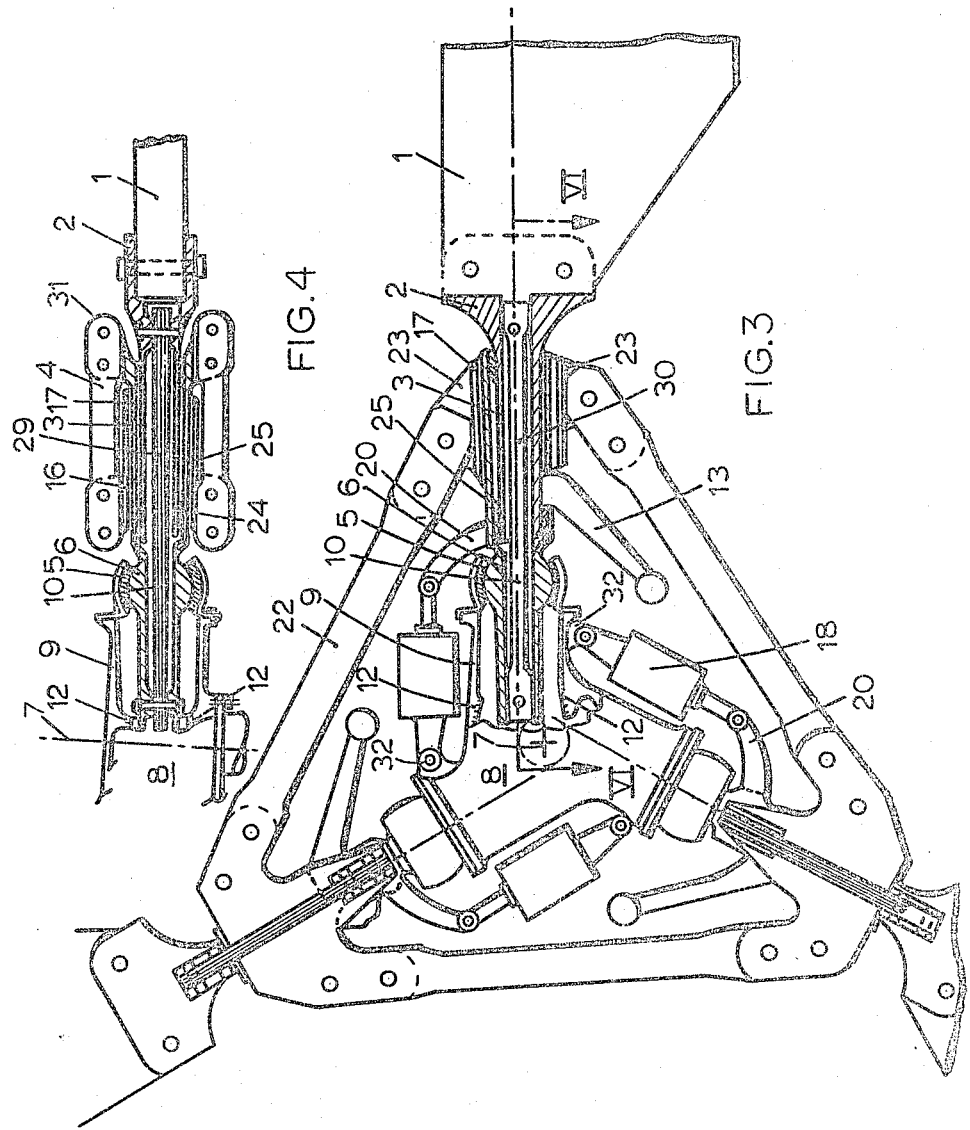

3,310,119
ROTOR HEADS FOR ROTARY WING AIRCRAFT
Kenneth Watson, Yeovil, England, assignor to Westland
Aircraft Limited, Yeovil, Somerset, England
Filed June 30, 1965, Ser. No. 468,540
Claims priority, application Great Britain, July 4, 1964,
27,681/64
6 Claims. (Cl. 170—160.53)

This invention relates to improvements in the means of attachment and articulation of blades in the rotor heads of rotary wing aircraft.

The blades of rotary wing aircraft require relative movement in three directions, in addition to the principal rotation in a coned plane, slightly angled to the horizontal, which provides support and thrust. These movements are, firstly, a damped lead and lag action of each individual blade during each single revolution, wherein each blade hinged about its root leads the average angular velocity when travelling through an arc in the opposite direction to the forward motion of the aircraft, and lags when moving through an arc in the same direction as the aircraft. Secondly, there is pitch change in which each individual blade rotates about its longitudinal axis, in order to alter the angle at which it attacks the air. Pitch changes in two patterns, a cyclic pattern during the course of each revolution to balance the thrust of an advancing blade with the thrust of a blade retreating from the direction of motion of the aircraft; and a collective pattern in which the pitch of all the blades is increased together to alter the thrust of the blade system. Finally, there is flap change, in which the blades hinge up and down at right angles to the plane of rotation. When the blade pitch or the rotational speed of the blades increases the greater thrust lifts the blades against the action of the centrifugal forces which tend to throw the blades into a flat plane, and the coning angle increases; conversely, the opposite happens, and the blades flap down when the blade pitch or the rotational speed decreases.

All these movements are normally accommodated by hinge members moving on ball or roller bearings and on thrust bearings, and all the bearings need frequent attention for servicing and overhauling, as they are subjected to considerable forces and are in constant movement through small arcs during each revolution of the rotor head.

The object of the invention is to eliminate substantially the need for servicing and to extend the life between overhauls of rotor hub assemblies by replacing ball bearings, roller bearings and thrust bearings with flexible members. This replacement will permit construction at a low cost of a more reliable and considerably lighter rotor head.

The invention generally consists in a rotor head for a rotary wing vehicle wherein the rotor blades are retained in relation to the rotor hub by a linkage system of flexible resilient members which accommodate all the articulation and axial rotation of the rotor blades.

In order that the invention may be more clearly understood a preferred embodiment will be described with reference to the accompanying drawings in which:

FIGURE 1 represents a plan view of the rotor head of a rotary wing aircraft according to the invention shown partly cut away to demonstrate the construction of the attachment system of one of the rotor blades.

FIGURE 2 represents a vertical cross-section of the attachment system of one of the rotor blades shown in FIGURE 1 taken along the line II—II.

FIGURE 3 represents a plan view of a second embodiment of the invention shown partly in cross-section.

FIGURE 4 represents a vertical cross-section of one of the rotor blade attachment systems shown in FIGURE 3 taken along the lines VI—VI.

FIGURE 1 shows the root end of the blade 1 of a rotary wing aircraft held in the jaws 2 of a blade root attachment member 3. The root attachment member 3, apart from the ends, is generally of elliptical cross-section deeply grooved above and below to provide a partial housing and fairing for a pair of primary laminated tension straps 4.

Articulation of the blade 1 and root attachment member 3 is provided by a part spherical elastomeric bearing 5, which surrounds a part spherical formation 6 on the root attachment member 3 near to the end adjacent to the axis of rotation 7 of the rotor hub 8. The spherical bearing 5 is mounted on a tubular hub member 9 which forms part of the rotor hub 8. The geometrical centre 10 of the spherical bearing provides pivotal location for all articulation of the rotor blade 1 and the root attachment member 3. Articulation is limited by a tubular end 11 extending from the spherical formation 6 of the root attachment member 3 which reacts against stops 12 on the inside of the tubular hub member 8. A blade pitch change lever 13 is mounted on tubular end 11 of the root attachment member 3 and extends through a slot 14 in the tubular hub member 9.

The primary laminated tension straps 4 are attached at the end remote from the rotor hub 8 to lugs 15 on the jaws 2 of the root attachment member 3 and provide a flexible resilient means of retaining the rotor blade 1 and the root attachment member 3 against the action of centrifugal and other forces produced during rotation of the rotor hub 7. The ends of the primary tension straps 4 nearest to the rotor hub 7 are attached to lugs 16 extending inwardly from an intermediate tubular retaining member 17 which surrounds the root attachment member 3 and the primary tension straps 4. The laminations of the primary tension straps 4 are longitudinal and vertical to the plane of rotation and allow the straps to flex in or parallel with the plane of rotation in order to accommodate drag or lead and lag movement of the rotor blade 1. The drag movement is limited by the stops 12 on the tubular hub member 8 and the tubular end 11 of the root attachment member 3 and the drag is restrained by a damper linkage which operates between the root attachment members of adjacent blades. The damper linkage includes dampers 18 affixed by linkage arms 19 and 20 to a collar 21 on the root attachment member 3.

The intermediate tubular retaining member 17 is held against the forces applied to it by the primary tension straps 4 by a pair of secondary laminated tension straps 22 attached to lugs 23 extending outwardly in the plane of rotation from each side of the retaining member 17. The other ends of the secondary tension straps 22 are attached to similar lugs on the retaining members 17 of the next adjacent rotor blade, one in a clockwise direction and one in an anticlockwise direction to form a mutually retaining linkage around the rotor hub 8.

The secondary tension straps 22 are laminated longitudinally and in the plane of rotation and are resilient and flexible to allow vertical flexure or flap movement of the rotor blade and its associated members.

Pitch change, blade feathering or rotary movement about the longitudinal axis of the blade is controlled by the pitch change lever 13 and accommodated by twisting movements of both pairs of tension straps 4 and 22 in series. The effective length of the straps permitting pitch change is the sum of the effective lengths of the primary 4 and secondary 22 tension strap systems, as the torque is passed from one pair of straps to the other by way of the intermediate tubular retaining member 17.

In the "at rest" position the longitudinal axis II—II of the rotor blade 1 and the root attachment member 3 does not pass through the axis of rotation 7 of the rotor hub 8, but is tangential to a circle having the rotor hub axis 7 as its centre. Thus the longitudinal axis of the rotor blade II—II is at an angle to a radius from the hub axis produced to pass through the pivotal location 10 for all blade articulation and the blade axis II—II, lags behind this radius away from the direction of rotation. This designed lag coincides with the mean position of the blade axis when the rotor head is at cruising speed and the torque applied is at cruising load, and assists to reduce the flexure of the primary tension straps 4 during operation.

Due to the fact that the effective length of the flexible tension straps 4 and 22 is not the same as the effective length between the pivotal location 10 and the primary strap attachment lugs 15, the root attachment member 3 will be forced to move longitudinally in the spherical bearing 5 to a small extent when the blade articulates and the straps flex. This movement in the spherical bearing 5 is accommodated by the resilience of the elastomer in the bearing.

In order to reduce the degree of flexure imposed upon the tension straps 4 and 22 during operation, it may be advisable to construct and fix the tension straps 4 and 22 and their attachment lugs 15, 16 and 23 so that the rotor blades 1 retain some degree of pitch when the system is at rest. A preferred condition consists in the blade 1 being positioned by the straps and lugs at an angle of pitch which corresponds to the mean or average of the pitch condition of the blade when operating at cruising speed; this may be approximately midway through the collective pitch range. However, the blade 1, when at rest, may be positioned by the straps and lugs at any angle which is considered desirable, then control by the pitch control lever 13 flexes the straps 4 and 22 away from this position.

In a similar manner the secondary tension straps 22 may be constructed and fixed so that when the blade is at a coning angle or vertical flap position corresponding to the operating coning angle when at cruising speed the straps 22 will be unflexed in the vertical sense and the three secondary tension straps 22 forming the mutual blade retaining linkage around the rotor hub 8 may be located in a flat plane.

Alternatively it may be desired to have the tension straps 22 unflexed at other positions, for example, when the blade coning angle corresponds to that which it will take up for the longest total period of its operational life or for example, when there is minimum flexing of all the tension straps 4 and 22 in the collective pitch sense.

It will be readily apparent to those skilled in the art that various refinements and modifications may be made to the embodiment hereinbefore described without departing from the scope of the invention. One of these modifications is hereby described in another embodiment also given by way of example only in which the numbers in so far as is appropriate correspond to those shown in FIGURE 1.

In the embodiment shown in FIGURES 3 and 4 each root attachment member 3 and rotor blade 1 is retained by a single torsion strap 30 to the rotor hub end of a fulcrum sleeve 25, and the root attachment member rotates on bearings 24 within the fulcrum sleeve. This torsion strap accommodates substantially all pitch changes of the rotor blade under the control of the pitch change lever 13. The fulcrum sleeve articulates in a part spherical elastomeric bearing 5 co-operating with a part spherical formation 6 on the fulcrum sleeve similar to the bearing of the first embodiment (shown in FIGURES 1 and 2).

The fulcrum sleeve is retained in position against the action of centrifugal and other forces by primary tension straps 4 attached to lugs 31 on the fulcrum sleeve remote from the rotor hub 8 and the other ends of the primary tension straps 4 are attached to lugs 16 extending outward from the tubular retaining member 17 which surrounds the part of the fulcrum sleeve 25. The tubular retaining member is restrained by secondary tension straps 22 which form a mutual linkage between adjacent members as in the embodiment shown in FIGURES 1 and 2. In this embodiment (FIGURES 3 and 4) the dampers 18 are attached between linkages 20 affixed to or integral with the fulcrum sleeve 25 and lugs 32 attached to the tubular mounting member 9 of the rotor hub.

This particular embodiment (shown in FIGURES 5 and 6) is particularly suitable for rotor heads according to the invention which have short stiff primary and secondary tension straps which, whilst accommodating lead and lag movements or flap movements, would prove too stiff for rotational, torsional or pitch changes. Thus, substantially all the pitch change rotation is accommodated by the torsion strap 30.

It will be readily apparent to those skilled in the art that many other modifications and refinements may be made and many other designs formulated without departing from the scope of the invention, for example the tension straps 4 and 22 and torsion straps 30 need not be laminated but could be made of any suitable members having the required flexible and resilient characteristics, or for example, the tubular retaining member 17 may be extended towards the rotor hub 8 and have a bearing formation or sleeve sandwiched within the part spherical elastomeric bearing 5 (FIGURE 1) or any of the other bearings if, for example, certain vibrations required attenuation.

In some designs the blade root attachment member could be an integral part of the rotor blade 1 and not attached to it with jaws and also in some designs the primary tension straps could be attached directly to the rotor blade 1 itself, instead of to the root attachment member 2.

It may also be advantageous to provide fairings or housings around the root attachment members or tension straps in order to reduce the wind resistance of the blade retention means whilst the rotor head is in operation.

I claim as my invention:

1. A rotor head assembly for a rotary wing aircraft, comprising a rotor hub, a plurality of rotor blade assemblies articulately mounted to extend from said rotor hub, an intermediate retaining member surrounding each rotor blade assembly substantially adjacent said rotor hub, primary tension straps extending between and attached to each respective retaining member and its associated rotor blade assembly for allowing flexing of the rotor blade assembly in a first direction, and secondary tension straps connected to and extending between adjacent intermediate retaining members of adjacent rotor blade assemblies for retaining said retaining members relative to said rotor hub and allowing flexing of the rotor blade assemblies in a second direction at a substantial angle to said first direction.

2. Apparatus as set forth in claim 1 wherein primary tension straps extend from points on the top and bottom of each retaining member so as to allow flexing in a plane substantially parallel to the plane of rotation of the rotor blade assemblies, the primary tension straps for a single retaining member being disposed substantially in a common vertical plane relative to the plane of rotation of the rotating blade assemblies, while said secondary tension straps are substantially parallel to the said plane of rotation and allow flexing in planes substantially normal to the plane of rotation.

3. Apparatus as set forth in claim 2 wherein said primary tension straps and said secondary tension straps are laminated in planes respectively normal to and parallel to the plane of rotation of said rotor blade assemblies.

4. Apparatus as set forth in claim 3 wherein the cumulative flexibility of said primary and secondary tension straps is sufficient to permit said rotor blade assemblies to pivot about their respective longitudinal axes by flexing said tension straps.

5. Apparatus as set forth in claim 2 wherein each rotor blade assembly comprises a blade rotatably mounted at its inner end in a fulcrum sleeve which is articulately mounted in said rotor hub, and said primary tension straps are connected to extend between said intermediate retaining member and said fulcrum sleeve.

6. Apparatus as set forth in claim 5 further comprising a torsion strap inside each fulcrum sleeve and connected at its ends to said fulcrum sleeve and to the inner end of said blade for retaining said blade against centrifugal force while permitting relative rotation between said blade and said fulcrum sleeve by torsionally flexing.

References Cited by the Examiner

UNITED STATES PATENTS

| | | |
|---|---|---|
| 2,068,617 | 1/1937 | Wilford et al. |
| 2,549,407 | 4/1951 | Apostolescu. |
| 2,640,554 | 6/1953 | Campbell 170—160.55 |
| 2,949,967 | 8/1960 | Jovanovich 170—160.53 |
| 3,111,172 | 11/1963 | Gorndt et al. 170—160.51 |
| 3,200,887 | 8/1965 | Ballauer 170—160.56 X |
| 3,231,222 | 1/1966 | Scheutzow. |

FOREIGN PATENTS

| | | |
|---|---|---|
| 692,503 | 8/1930 | France. |
| 176,394 | 8/1961 | Sweden. |

MARTIN P. SCHWADRON, *Primary Examiner.*

EVERETTE A. POWELL, Jr., *Examiner.*